United States Patent
Contreras et al.

(10) Patent No.: US 10,148,821 B2
(45) Date of Patent: Dec. 4, 2018

(54) SYSTEM AND METHOD FOR MINIMAL TOUCH CLOUD-BASED CONFERENCE CALL SERVICE

(71) Applicant: Dell Products, LP, Round Rock, TX (US)

(72) Inventors: Robert A. Contreras, Austin, TX (US); Chaula B. Patel, Austin, TX (US); Vishwanath Jayaraman, Austin, TX (US); Jianwen Yin, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 482 days.

(21) Appl. No.: 13/709,609

(22) Filed: Dec. 10, 2012

(65) Prior Publication Data

US 2014/0161243 A1 Jun. 12, 2014

(51) Int. Cl.
*H04M 3/56* (2006.01)
*H04M 3/42* (2006.01)

(52) U.S. Cl.
CPC ............ *H04M 3/56* (2013.01); *H04M 3/565* (2013.01); *H04M 3/42059* (2013.01); *H04M 2203/5054* (2013.01)

(58) Field of Classification Search
CPC ............... H04L 65/403; H04L 12/1818; H04L 12/1822; H04M 2203/5054
USPC ....... 370/260, 261, 262; 379/202.01, 203.01, 379/204.01
See application file for complete search history.

(56) References Cited

U.S. PATENT DOCUMENTS

| | | | |
|---|---|---|---|
| 6,922,718 B2 | 7/2005 | Chang | |
| 7,171,221 B1 | 1/2007 | Amin et al. | |
| 8,368,738 B2* | 2/2013 | Schindler | 348/14.08 |
| 8,787,874 B2* | 7/2014 | Gisby et al. | 455/410 |
| 2003/0003900 A1 | 1/2003 | Goss et al. | |
| 2008/0037748 A1* | 2/2008 | Jefferson | H04M 3/436 379/202.01 |
| 2010/0198644 A1 | 8/2010 | Renfro et al. | |
| 2011/0135080 A1* | 6/2011 | Lingafelt et al. | 379/203.01 |
| 2012/0269335 A1* | 10/2012 | Goguen et al. | 379/202.01 |
| 2012/0281823 A1* | 11/2012 | Colbert | H04M 3/563 379/202.01 |
| 2013/0017780 A1* | 1/2013 | Rose et al. | 455/41.1 |
| 2013/0251132 A1* | 9/2013 | Manor | 379/202.01 |

OTHER PUBLICATIONS

"Automate Call Forwarding With Bluetooth Proximity Detection," Miller, Nov. 8, 2005, http://www.engadget.com/2005/11/08/automate-call-forwarding-with-bluetooth-proximity-detection/.

* cited by examiner

*Primary Examiner* — Nafiz E Hoque
(74) *Attorney, Agent, or Firm* — Prol Intellecual Property Law, PLLC; H. Kenneth Prol

(57) ABSTRACT

A method schedules a conference call via a scheduler application on a first information handling system by recording a date, a start time, and an end time and setting invitees for the call. The method further receives bound identification data from an invitee, associates the bound identification data with the scheduled conference call, and stores the bound identification data in a database to enable minimal touch access to the conference call.

20 Claims, 6 Drawing Sheets

US 10,148,821 B2

SYSTEM AND METHOD FOR MINIMAL TOUCH CLOUD-BASED CONFERENCE CALL SERVICE

FIELD OF THE DISCLOSURE

The present disclosure generally relates to a system and method for simplified connectivity to a conference call that has bound specified data.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination. For example, information handling systems may be used to participate in or manage a conference call among multiple users.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 4 indicates the relationship between FIGS. 4A and 4B;

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
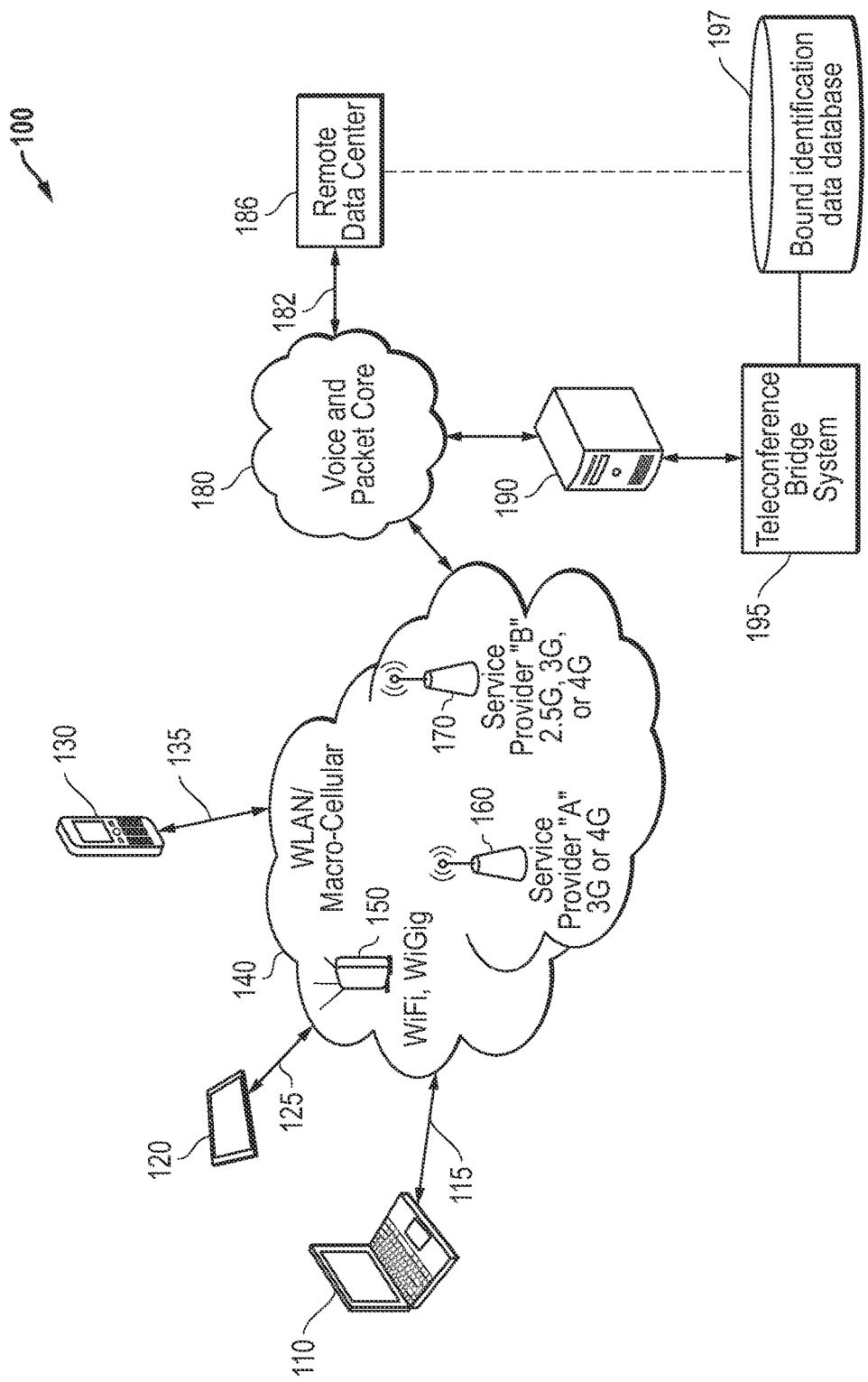
FIG. 1 is a block diagram of a network environment containing various information handling systems available for voice and data communication with a conference call according to an embodiment of the present disclosure.

FIG. 1 illustrates a network 100 that can include one or more information handling systems. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a smartphone, a PDA, a mobile information handling system, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

In a particular embodiment, network 100 includes networked mobile information handling systems 110, 120, and 130, wireless network access points 150, macrocellular towers 160 and 170, and multiple other wired and wireless connection link options. Systems 110, 120, and 130 represent a variety of computing resources of network 100 including client mobile information handling systems, data processing servers, network storage devices, local and wide area networks, or other resources as needed or desired. As specifically depicted, systems 110, 120, and 130 may be a laptop computer, tablet computer, or smartphone device. These user mobile information handling systems 110, 120, and 130, may access a wireless voice and data resources 140 such as a local area network or a macro-cellular network. For example, the wireless local area network may be the wireless local area network (WLAN), a wireless personal area network (WPAN), or a wireless wide area network (WWAN). Since WPAN or WiFi Direct Connection and WWAN networks can functionally operate similar to WLANs, they may be considered as wireless local area networks (WLANs) for purposes herein. Components of a WLAN may be connected by wireline or Ethernet connections to a wider external network. For example, wireless network access points 150 may be connected to a wireless network controller and an Ethernet switch. Wireless communications across wireless local area network may be via standard protocols such as IEEE 802.11 WiFi, IEEE 802.11 ad WiGig, IEEE 802.15 WPAN or similar wireless network protocols.

Alternatively, other available wireless links within network 100 may include wireless macro-cellular connections via one or more service providers 160 and 170. In this way, mobile information handling systems 110, 120, and 130 may communicate voice and data within network 100. Service provider macro-cellular connections may include 2G standards such as GSM, 2.5G standards such as GSM EDGE and GPRS, 3G standards such as W-CDMA/UMTS and CDMA 2000, or 4G standards such as WiMAX, LTE, and LTE Advanced.

To communicate within the network 100 wirelessly, the systems 110, 120, and 130 each have a wireless interface module or wireless adapter, hereinafter referred to as a wireless adapter. System 110 includes a wireless adapter, system 120 includes a wireless adapter, and system 130 includes a wireless adapter. The wireless adapters are operable to provide a wireless radio frequency interface 115, 125, and 135 to transmit and receive voice and data between the respective systems 110, 120, and 130 and one or more external networks via wireless network 140. Wireless links 115, 125, and 135 may connect to the external network via a WPAN, WLAN or similar wireless switched Ethernet connection. The wireless data communication standards set forth protocols for communications and routing via access point 145, as well as protocols for a variety of other operations. Other operations may include handoff of client devices moving between nodes, self-organizing of routing operations, or self-healing architectures in case of interruption.

Wireless links 115, 125, and 135 may connect to a macro-cellular wireless network 150 via one of the service providers 160 or 170. In the depicted example, service provider A 160 may provide wireless data connectivity via a 3G or 4G protocol. Service provider B 170 may offer connectivity via a 2.5G, 3G or 4G protocol. Any combination of macro-cellular wireless connectivity is possible for each or both of the service providers. The connection quality of service (QOS) and speed of wireless links 115, 125, and 135 may vary widely depending on several factors including the service provider bandwidth, the number of mobile information handling systems and users in a location, radiofrequency signal strength or quality, success of handoff measures and other factors. Due to varying quality of service, a call may be inadvertently dropped or terminated for a number of reasons.

The voice and packet core network 180 may contain externally accessible computing resources and connect to a remote data center 186. The voice and packet core network 180 may contain multiple intermediate web servers or other locations with accessible data (not shown). Connection 182 between the wireless network 140 and remote data center 186 may be via Ethernet or another similar connection to the world-wide-web, a WAN, a LAN, another WLAN, or other network structure. Such a connection 182 via WLAN access point/Ethernet switch 145 to the external network is a backhaul connection. The access point 150 may be connected to one or more wireless access points in the WLAN before connecting directly to a mobile information handling system or may connect directly to one or more mobile information handling systems 110, 120, and 130. Alternatively, mobile information handling systems 110, 120, and 130 may connect to the external network via base station locations at service providers such as 160 and 170. These service provider locations may be network connected via backhaul connectivity through the voice and packet core network 180.

The voice and packet core network 180 may contain teleconference bridge server 190 which may operate teleconferencing application 195 to receive telecommunication accesses via one or more dial-in numbers. In typical operation, teleconferencing application 195 may prompt users of the teleconference bridge to input passcodes, host codes, user identification, and voice prompts among other connection access information. The teleconferencing application 195 further coordinates incoming calls to one or more teleconferences, verifies inputs, and connects callers to a teleconference. The teleconferencing bridge application 195 may have additional functionality such as an ability to accept commands during the teleconference (e.g., mute, volume and other controls). Additionally, teleconferencing application 195 may have an ability to share data such as presentation powerpoints, realtime data, or other applications to be viewed and utilized by callers in the teleconference.

Dialing in, entering passcodes, responding to voice prompts and other connection access procedures may be time consuming and burdensome during conference calls. Additionally it may cause delay during the conference call. The present disclosure provides an efficient system and method for accessing conference calls via a conference call management system enabling minimal touch set up and access utilizing dialed-from phone number data for access.

In one embodiment, the teleconferencing bridge application may be connected to a bound identification database 197 used for the minimal touch access to a conference call. The teleconferencing bridge server 190 may also host the teleconferencing management system executing the minimal touch access method of the present disclosure. The teleconferencing management system may also be part of the teleconferencing bridge system application 195 in another embodiment. The teleconferencing management system may access the bound identification database for matching dialed-from phone numbers received during teleconference system access attempts from mobile information handling systems such as 110, 120, and 130. As described further herein, conference call management system of the present disclosure determines a match for a scheduled conference call to enable the minimal touch access to the conference call. Also described herein, the conference call management system may also set up a scheduled conference call associating several possible dialed-from numbers acceptable to access the conference call with invitees. Specific parameters may be set as further described below.

Remote data center 186 may include web servers or resources within a cloud environment. For example, remote data centers can include additional information handling systems, data processing servers, network storage devices, local and wide area networks, or other resources as needed or desired. Having such remote capabilities may permit fewer resources to be maintained at the client mobile information handling systems 110, 120, and 130 allowing streamlining and efficiency within those devices. Similarly, remote data center 186 permits fewer resources to be maintained in other parts of network 100 such as at teleconferencing bridge server 190. In this case, the teleconferencing management system of the present disclosure may be hosted at remote data center 186. Access may be made to bound identification data database 197 which may also be hosted at remote data center 186. Management of the minimal touch conference call accessibility may be handled at the remote data center 186 with communications to teleconference bridge server 190 via voice and packet core 180.

In another example embodiment, the cloud or remote data center 186 may run hosted applications for systems 110, 120, and 130. This may occur by establishing a virtual machine application executing software to manage applications hosted at the remote data center 186. Mobile information handling systems 110, 120, and 130 are adapted to run one or more applications locally, and to have hosted applications run in association with the local applications at remote data center 186. The virtual machine application may serve one or more applications to each of user mobile information handling systems 110, 120, and 130, including a conference call management system and the interface with such a system. Thus, as illustrated, systems 110, 120, and 130 may be running applications locally while requesting data objects related to those applications from the remote data center 186 via wireless network. For example, an electronic mail client application may run locally at system 110 and integrate with the scheduling application of a conference call management system. The electronic mail client application may be associated with a host application that represents an electronic mail server and a conference call management system. In another example, a data storage client application such as Microsoft Sharepoint may run on system 120. This may also be integrated with or operate in connection with a teleconferencing management system in the event document sharing occurs in connection with a managed conference call. These too may be associated with a host application running at remote data center 186 that represents a Sharepoint data storage server and a conference call management system server. In a further example, a web browser application may be operating at system 130. The web browser application may request web data from a host application that represents a hosted website and associated applications running at remote data center 186.

The wireless adapters in systems 110, 120, and 130 can represent add-in cards, wireless network interface modules that are integrated with a main board of respective systems 110, 120, and 130 or integrated with another wireless network interface capability, or any combination thereof. In an embodiment the wireless adapters may include one or more radio frequency subsystems including transmitters and wireless controllers for connecting via a multitude of wireless links. In an example embodiment, a mobile information handling system may have a transmitter for WiFi or WiGig connectivity and one or more transmitters for macro-cellular communication. The radio frequency subsystems include wireless controllers to manage authentication, connectivity, communications, power levels for transmission, buffering, error correction, baseband processing, and other functions of the wireless adapters.

Although 115, 125, and 135 are shown connecting wireless adapters to wireless network 140, actual wireless communication may link through a wireless access point 150 or a service provider tower such as that shown with service provider A 160 or service provider B 170. The wireless adapters may be capable of connecting via a WLAN 140 or a macro-cellular network (WWAN) 150 and service provider 160 or 170 in a variety of the wireless standards as described above. Each of the wireless adapters for client mobile information handling systems 110, 120, and 130 are uniquely identified on network 100 via one or more unique identifiers permitting authentication and access. For example, the wireless device can each be identified by one or more Subscriber Identity Modules (SIM), a Dialed Number Identification Service (DNIS) or similar identification system for telecommunications, one or more of a media access control (MAC) address, an Internet protocol (IP) address, a world wide name (WWN), or another unique identifier such as a user name and password, as needed or desired. Association of a user and a wireless interface module of a user information handling system may be made via communications across a networking control plane or via a macrocellular telecommunications switching system and backbone. For example, a telephone number may be associated with a call made by a wireless information handling system such as 110, 120, or 130. Upon executing a call, such as via a macrocellular telecommunications connection or voice over IP (VOIP), the mobile information handling system may be identified by a dialed-from phone number. This data may be received via a DNIS system, or via a packet transfer in the case of VOIP. Such a number may be identified to the information handling system receiving the call, such as teleconference bridge server 190. In another example, a user information handling system may be associated with a user via communication with a database such as Home Subscriber Server (HSS), Active Directory or similar database. This database may reside in the voice and packet core network 180, at a base station at 160 or 170, or elsewhere in the external network. The wireless adapters may operate in accordance with any wireless data communication standards. To communicate with wireless local area network 140, standards including IEEE 802.11 WLAN standards, IEEE 802.15 WPAN standards, WWAN such as 3GPP or 3GPP2, or similar wireless standards may be used. The wireless LAN network 140 may provide connectivity via WiFi or WiGig for example. The wireless network 140 may have a wireless mesh architecture in accordance with mesh networks described by the above wireless data communications standards or similar standards.

Figure 2:
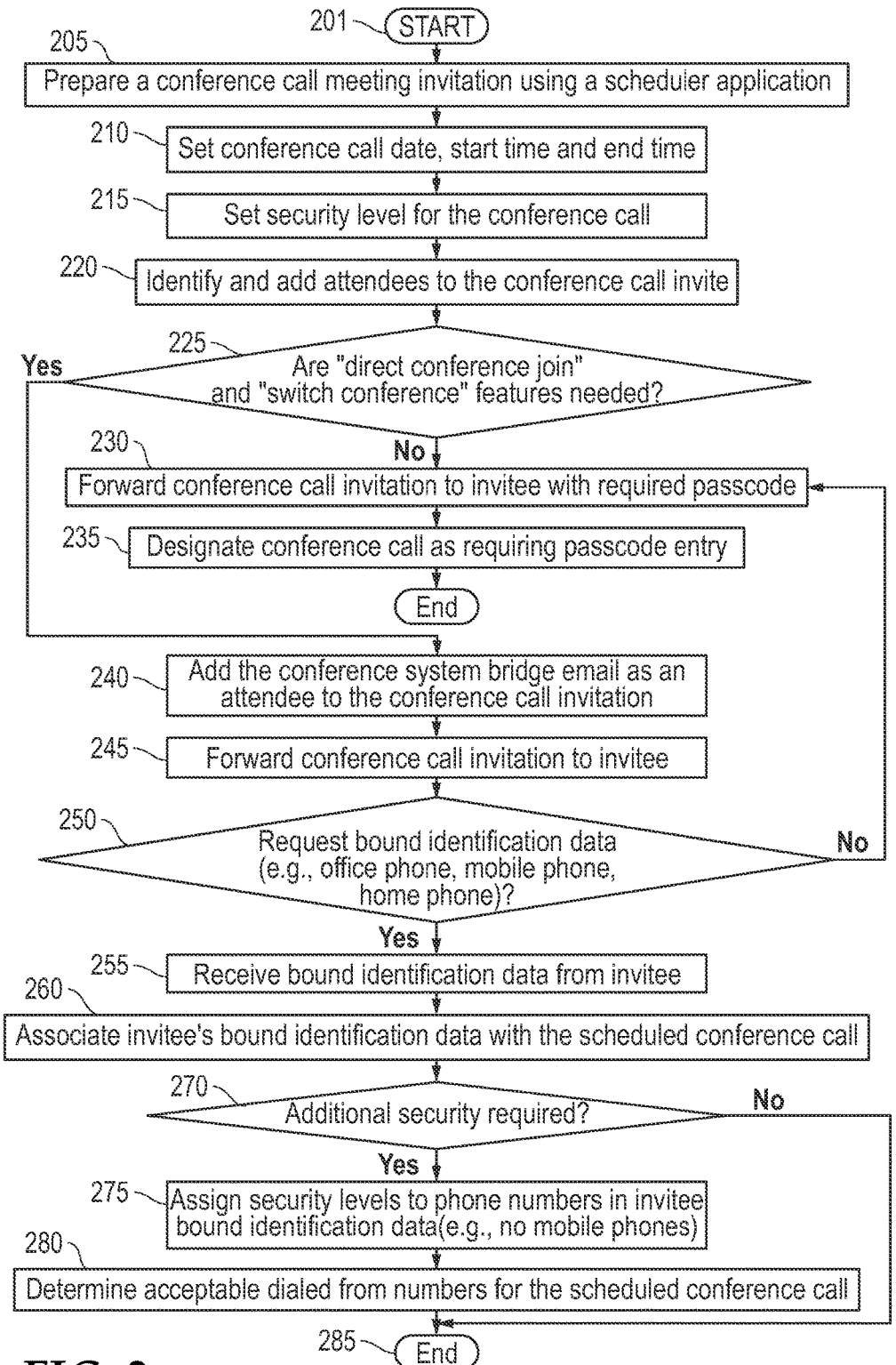
FIG. 2 is a flow diagram illustrating a method of scheduling a conference and establishing bound identification data pertaining to minimal touch access to the conference call, according to an embodiment of the present disclosure.

FIG. 2 shows a method 200 in accordance with an embodiment of the present disclosure for scheduling a conference call, inviting attendees, and gathering bound identification data for the invitees that may be used to enable minimal touch access to the conference call according to an embodiment of the present disclosure. The method 200 generally describes user context operation of a conference call meeting set up and gathering of identifying data from invitees prior to the call. In the embodiment of method 200, the flow is depicted in a particular order, however the method to set up the conference call and gather bound identification data for invitees may occur in any order and the disclosure is not limited to the order shown in 200. Additionally, the embodiment depicted in method 200 is a specific embodiment involving an example of a conference call setup and data gathering using a scheduling application as part of an email system working in connection with the teleconference bridge management system. The invitee user information handling systems may connect with a teleconference bridge via a voice-over-IP (VOIP) connection, a macrocellular connection such as CDMA, or another type of voice or data connection.

The flow begins at block 201 where a scheduler application for the teleconference bridge is started. The scheduler application is part of or interfaces with the conference call management system and a calendaring system. The calendaring system may be part of a larger communications system such as email, instant messaging, or other similar system. For example, an application such as MS Outlook or MS Lync may be used for communication of the conference call scheduling. At block 205, a conference call meeting invitation is prepared using the scheduler application. Several parameters are set up to schedule the conference call. At block 210, the conference call date, start time and end time are set. To maintain security, limitation may be place on when invitees may access a teleconference such as not until after the start time and before the end time. To account for lead time of logging into a conference call by the disclosed method and system, the conference call may alternatively set a dial-in time. The dial-in time allows invitees to access the teleconference before the conference call start time. Although not depicted in FIG. 2, an unscheduled conference call system may be employed where the conference bridge is always available to an individual host and user but which still employs some of the features of the disclosed method or system.

At block 210, a security level is set for the conference call. The security level value may depend on the sensitivity of what is discussed or the desirability of limiting the phone numbers the invitees may use to access the conference call. The security level may be set by a meeting organizer to permit callers to access the conference call via only a more preferred or trusted dialed-from numbers while blocking other less preferred or trusted dialed-from numbers. Thus, security values are also assigned to the dialed-from numbers as described further below. The security level for the conference call may be set to allow or disallow access by dialed-from numbers. For example, if calling in from a mobile phone is a security risk or simply undesirable to the meeting organizer because of poor connection quality or background noise, the dialed-from number for the mobile phone may be assigned a low security level. When the teleconference is set up, a higher security level for the teleconference may disallow minimal touch access by a mobile phone dialed-from number. In another example, a conference call may be set up to simultaneously require viewing of shared presentations or multimedia data. A dialed-from number may be preferred that has such a capability. Thus, invitee dialed-from numbers may be limited to sources known to also be able to accommodate multimedia viewing such as a VOIP connection from a laptop versus a home landline telephone.

At block 220, invitees are identified and added to the conference call invite. The flow proceeds to decision diamond 225 where the user information handling system operating the conference call management application and scheduler determines whether the minimal touch "direct conference join" features and "switch conference" features of the present disclosed methods and systems will be enabled. If none of the features are to be enabled, the conference call management application forwards the conference call invitation at block 230 to invitees with required access passcodes included. This may be done via email, IM, or other communication. The invitation may be placed, for example, on a calendar according to the date, dial-in time, start time, and end time as well for a scheduled conference call. At block 235, the conference call is designated as requiring passcode entry for access in the conference call database 197.

If the minimal touch features are to be enabled at decision diamond 225, then the method proceeds to block 240. At block 240, the conference bridge system email is added as an invitee to the conference call invitation. The conference call bridge system may then collect the called from number, passcode and other bound identification data from call invitees. Once this data is stored, a bound identification database associated with or in connection to the conference call bridge system may be used to implement the minimal touch system. The conference call management application forwards the conference call invitation at block 245 to invitees. As above, this may be done via email, IM, or other communication. The invitation may also be placed on a calendar according to the date, dial-in time, start time and end time as well for the scheduled conference call. At decision diamond 250, the method requests identification data from the invitee to be bound with the conference call data. The bound identification data may include one or more dialed-from phone numbers that the invitee has designated for use to access conference calls. It may also include the email, IM, or other identification of the invitee, invitee name, and other identifying information about the invitee.

If no invitee identification data is available to be bound with the conference call, the system proceeds back to block 230 to re-forward the conference call invitation or amend the conference call invitation to include the required passcode. Then the method and system designate the conference call as requiring passcode entry, at least partially, for this invitee in the conference call database 197.

If identification data is available to be bound with the conference call for the invitee, that data is transferred to the conference call management application at block 255. The bound identification data is associated with the scheduled conference call at block 260. At block 265, the bound identification data is stored in a conference call database 197 accessible by the conference call management application either from the teleconference bridge system 195 or a remote data center 186 in the example embodiment. The method proceeds to decision diamond 270 where the system determines if additional security has been designated for the conference call. If not, the method for setting up the conference call ends and the final data set associated with the scheduled conference call is stored at 285.

If additional security is desired, the method and system proceed to block 275 where security levels are assigned to the dialed-from phone numbers in the bound identification data associated with an invitee to a conference call. Rules set by a meeting organizer may determine what security levels are assigned. The security levels may be set by category of device dialed-from. For example, if a meeting organizer prohibits or prefers added security of invitees calling in from a mobile phone due to the possibility of the mobile phone being lost or multiple users having access to the phone, the dialed-from mobile phone numbers of the invitees may receive a low security levels. This device may then be barred from access to a conference call by requiring a higher security level to access via minimal touch or require manual entry of a passcode. Alternatively, the security levels may be pre-assigned to by an invitee to specific dialed-from numbers, for example, if a dialed-from device is known by the invitee to be available to other users at the time scheduled for a call.

Upon assigning or receiving the security levels for the dialed-from numbers in the bound identification data, the method and system proceed to block 280. At block 280, the conference call management system determines which dialed-from numbers are acceptable for access to the scheduled conference call by comparing security levels for the numbers to the security level set for the conference call. This data may be recorded in the conference call database 197 as well. Other data may also be bound with the conference call along with the bound identification data for invitees. For example, the system may assign a participant pass code to be auto-entered upon an invitee dialing from one of the phone numbers in the bound identification data. One or more meeting organizers for the conference may have meeting organizer information designated via the call management system. The meeting organizer designated data may include a leader passcode. Such a leader passcode may be autodialed by the conference call management system upon access by a meeting organizer using a dialed-from phone number. In some teleconference bridge system embodiments, the meeting organizer may also need to have a participant passcode as part of the bound identification data. After all data is associated with the scheduled conference call, including bound identification data, the process for setting up a conference call that may enable minimal touch access ends at 285.

Figure 3:
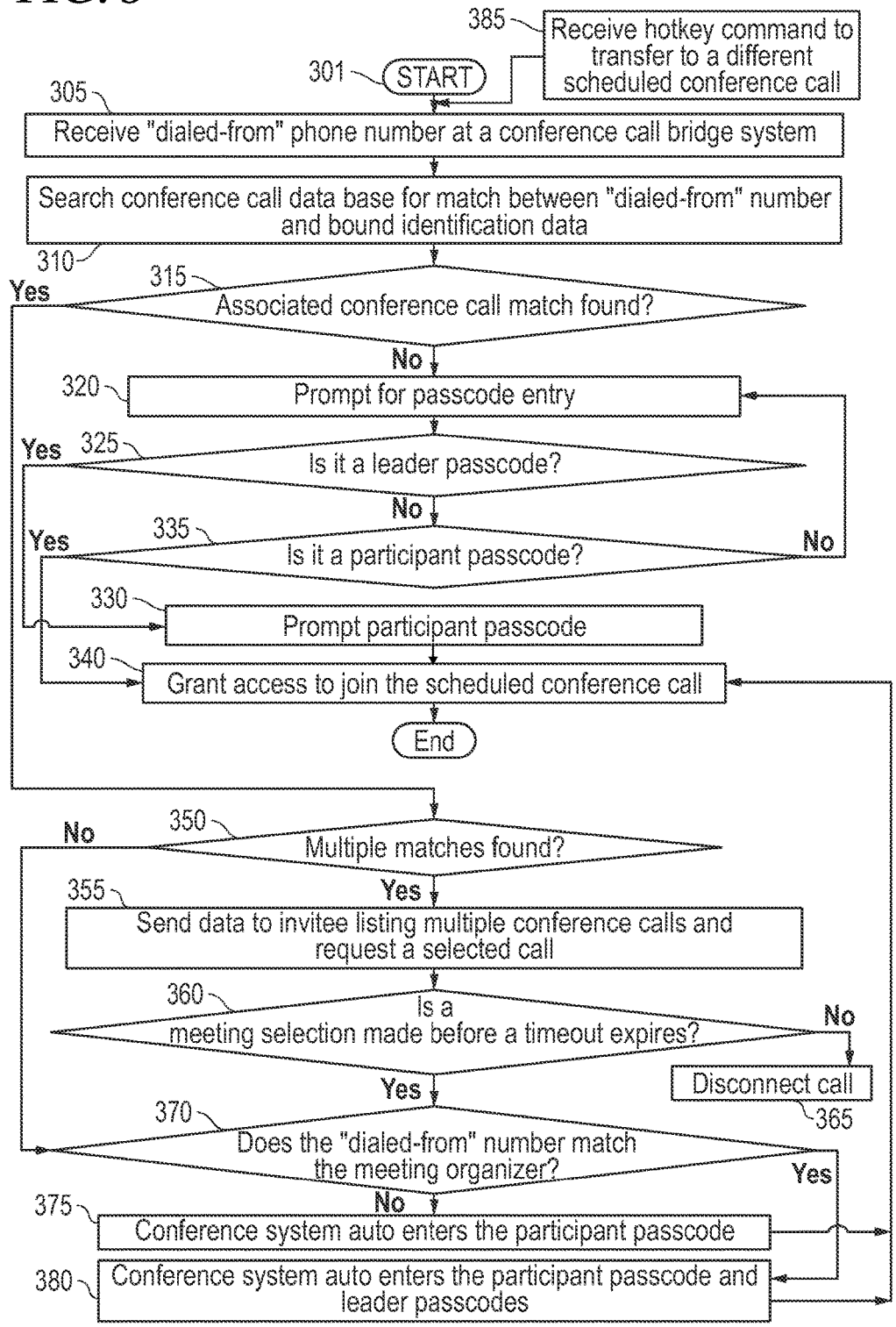
FIG. 3 is a flow diagram illustrating a method of minimal touch access by a user information handling systems to one or more conference calls on a teleconference bridge, according to an embodiment of the present disclosure.

FIG. 3 depicts an embodiment of a conference call management system and method utilizing a minimal touch access feature for accessing a conference call. The access is between an invitee user information handling system such as 110, 120, or 130 and a telecommunications teleconference bridge system 195 using a conference call management system and bound identification data stored in a conference call database. In one embodiment, the conference call management system is part of the teleconference bridge system 195 and accesses the conference call database containing bound identification data and other data 197. In another embodiment, the conference call management system and conference call data base may be cloud based and reside in a remote data center 186. In a cloud based system, the conference call management system and conference call database may interface with and send commands and data to the teleconference bridge system via packet core 180.

The flow begins at 301 with a teleconference access attempt. The conference call management system, whether part of the teleconference bridge or separately operating, is notified of an invitee dialing into the teleconference bridge system. At 305, the conference call management system receives a dialed-from phone number from a user information handling system such as 110, 120, or 130. The conference call management system may receive the data via the teleconference bridge if it is a cloud based system. In one embodiment, the dialed-from data may be received as DNIS data via the telecommunications system. Alternatively, similar dialed-from phone number data may be received as packet data via digital VOIP or similar data based voice connections.

At block 310, the method and conference call management system may search the conference call database for a match between the dialed-from phone number and the bound identification data stored there. Limiting parameters may be placed on the determination of a match for the dialed-from numbers. For example, a time limit window may be placed on the dialed-from number matching to a conference call. The time limit window may be limited to a calendar day to prevent other conference calls on different days from being returned as matches. Smaller time window limits are also contemplated. In another example, a search of scheduled conference calls may be limited to those occurring within an hour window, e.g., one half hour on either side of a dialed access to the conference call management system minimizing the period of time the minimal touch access system is available to access calls. It can be appreciated that many variations on the time window limiting a search for a matching dialed-from number is contemplated.

Proceeding to decision diamond 315, the method and conference call management system determines whether a conference call bound identification data set matches the dialed-from number of the teleconference access attempt. If no bound identification data is found in the conference call database matching a stored conference call, the flow proceeds to block 320 where the conference call management system initiates an ordinary connection routine to a teleconference call via the teleconference bridge. The system sends data to the potential invitee at the unrecognized dialed-from number and prompts entry of a passcode. At decision diamond 325, the system determines if the passcode is a leader passcode set for a conference call stored in the conference call database. If it is a leader passcode, the system then proceeds to block 330 and sends data prompting the leader/invitee to enter a participant passcode. Upon receipt of the participant passcode the flow proceeds to block 340 where access to the conference call is granted. After access is granted, the conference call management system and the teleconference bridge may make a connection to the conference call.

If the passcode is not a leader passcode at decision diamond 325, the flow proceeds to decision diamond 335 where it is determined whether the received data is a participant passcode matching a conference call passcode. If it is not a participant passcode, the flow returns to block 320 to prompt the invitee to re-enter a passcode. An error message of an incorrect passcode entry may be included in the data sent to the invitee at the dialed-from number requesting re-entry. In one embodiment, the number of attempts at re-entry of a passcode may be limited for security reasons such that upon reaching a limit, the call is disconnected. If the data received at decision diamond 335 is determined to be a participant passcode, the flow then proceeds to block 340 as above and access is granted.

If at decision diamond 315, however, conference call bound identification data is found in the conference call database matching a dialed-from number, the flow proceeds to decision diamond 350. At 350, the method and system determines if multiple matches have been found with bound identification data matching the dialed-from number. If only one match has been found the flow proceeds to decision diamond 370 to determine if the dialed-from number is that of a meeting organizer. If multiple matches for conference calls have been found, the flow proceeds to block 355 where a list of all the scheduled conference calls is compiled. The list may include all matched calls scheduled to occur during a designated time period. As above, that may be for one day, a period of a couple of hours, or a shorter window of time. The list of conference calls is sent to the information handling system at the dialed-from number. Along with the list, the method and conference call management system sends a request seeking which conference call on the list is selected. A timer is started and the flow proceeds to decision diamond 360 to determine if a conference call selection has been made before a set timeout expires. If no selection is made, the system may re-assert its request a limited number of times. Alternatively, at block 365 the flow may disconnect the conference call access attempt. If the meeting selection is made at decision diamond 360 and the data is received by the conference call management system before the timeout expires, the flow proceeds to decision diamond 370 to determine if the dialed-from number matches a meeting organizer in the bound data for the selected conference call.

If the dialed-from number does not match a meeting organizer at decision diamond 370, the flow proceeds to block 375. At block 375, the method and conference call management system auto-enters a participant passcode for the scheduled conference call. The flow then proceeds to block 340 where access is granted to join the scheduled conference call. If the dialed-from number does match a meeting organizer at decision diamond 370, the flow proceeds to block 380. At block 380, the method and conference call management system auto-enters a leader passcode and, if necessary, also a participant passcode for the scheduled conference call. Then the flow proceeds to block 340 where access is granted to join the scheduled conference call. Upon access being granted, a connection to the scheduled conference call is made.

In an alternative embodiment, a conference call access attempt may occur via a hotkey command received from an invitee user information handling system. The hotkey command may be a single keystroke, button depress, or touchscreen gesture or response, or it may be a series of keystrokes, button depresses, or touchscreen gestures or responses, or any combination. Data from these actions may be gathered and used and sent as a hotkey indicator. The hotkey indicator may, upon receipt at a conference call management system, command connection to a conference call or a transfer among conference calls in at least one embodiment. At block 385, the conference call management system may receive a hotkey indicator commanding a transfer to a different conference call. This embodiment may be also understood to describe a conference call management system receiving a hotkey command to either transfer to a different conference call hosted on the teleconference bridge system (as shown) or access a conference call in the first instance (not depicted). The invitee user information handling system may have already dialed into the teleconference bridge from a dialed-from number or the hotkey command may trigger a dialed-from number to be transferred. After a hotkey command is received from the invitee system, the conference call management system and method proceeds to block 305 assessing the ongoing "dialed-from" connection to determine the correct conference call. The system and method then proceed through the flow diagram from 305 to 380 as discussed above for FIG. 3.

Figure 4A:
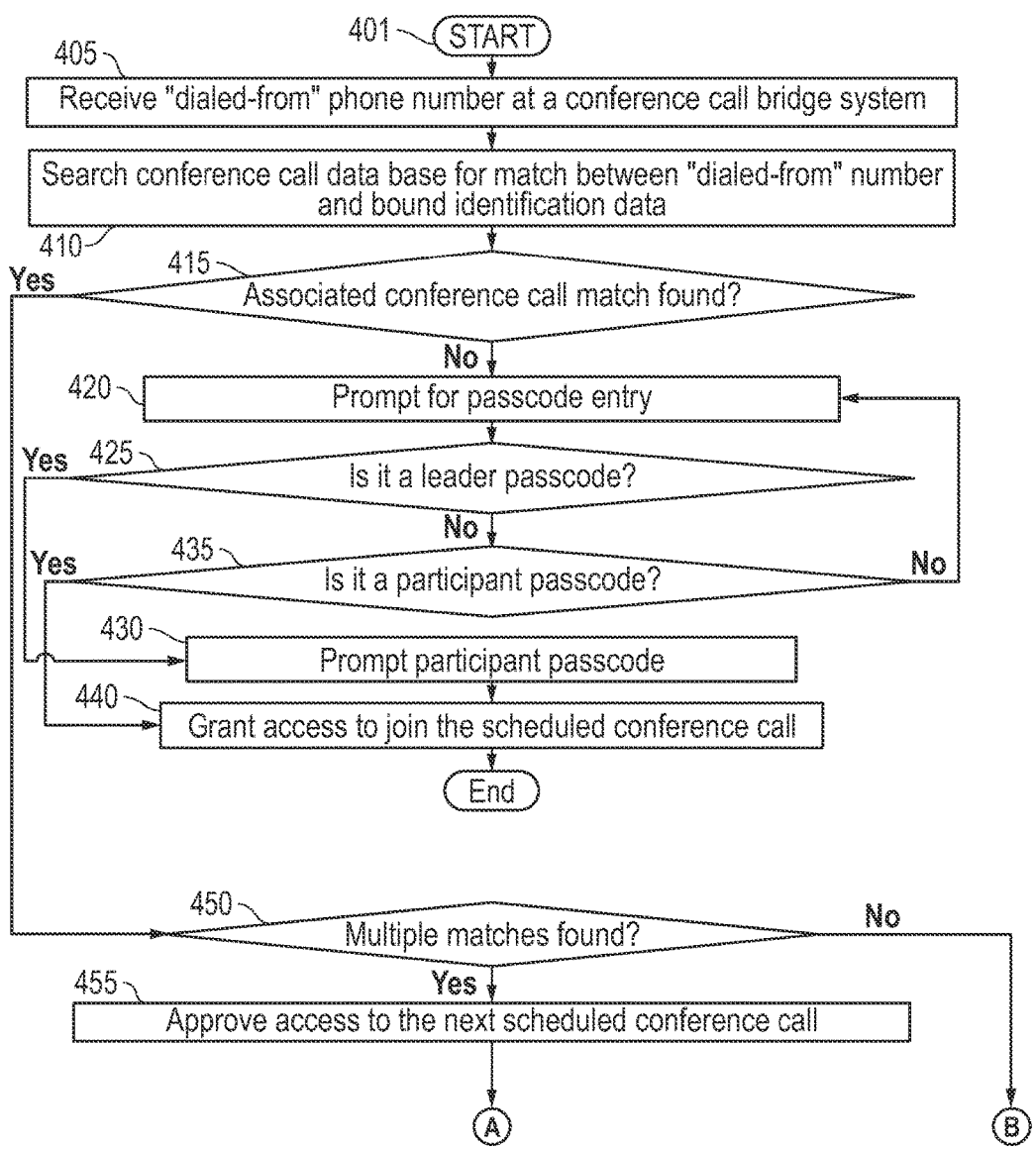
FIGS. 4A and 4B are flow diagrams illustrating a method of minimal touch access by a user information handling systems to one or more conference calls on a teleconference bridge according, to another embodiment of the present disclosure.
Figure 4B:
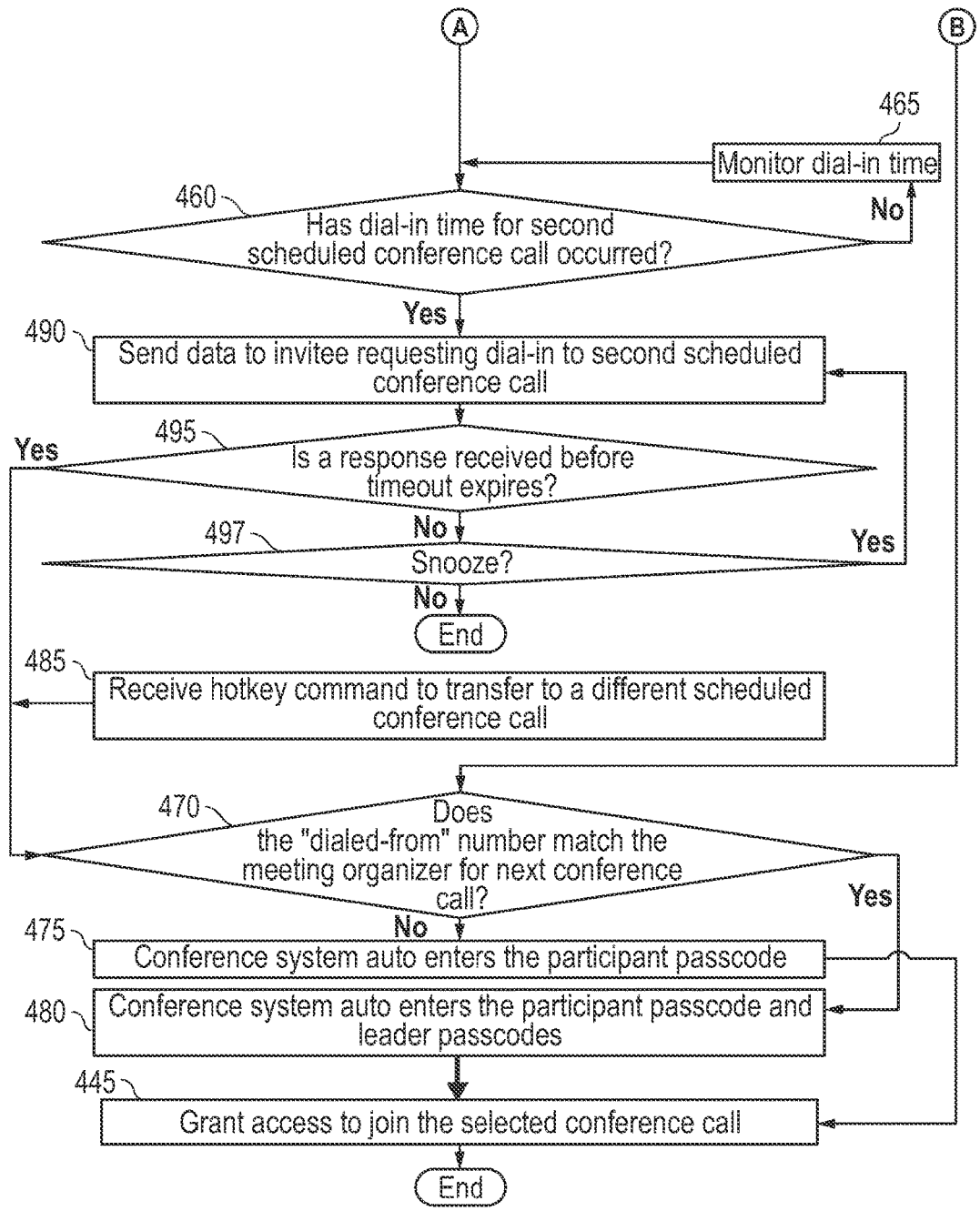

FIG. 4 depicts the relationship between flowcharts shown in FIGS. 4A and 4B. FIGS. 4A and 4B depict another embodiment of a conference call management system and method utilizing a minimal touch access feature for accessing one or more conference calls. The access is between an invitee user information handling system such as 110, 120, or 130 and a telecommunications teleconference bridge system 195 using bound identification data stored in a conference call database. As before, the conference call management system may be part of the teleconference bridge system 195 and access the conference call database containing bound identification data and other data 197. In another embodiment, as before, the conference call management system and conference call data base may be cloud based and reside in a remote data center 186. In a cloud based system, the conference call management system and conference call data base may interface with and send commands and data to the teleconference bridge system via packet core 180.

The flow begins at 401 of FIG. 4A with a teleconference access attempt. At 405, the conference call management system receives a dialed-from phone number from a user information handling system such as 110, 120, or 130.

Proceeding to block 410, the method and conference call management system searches the conference call database for a match to the dialed-from phone number in the bound identification data stored there as described above for FIG. 3. Time limits on when to search for matching scheduled conference calls may be implemented in many variations as described above. At decision diamond 415, the method and conference call management system determines whether a bound identification data set for one or more conference calls match the dialed-from number of the teleconference access attempt.

If no match to conference call bound identification data is found in the conference call database, the flow proceeds to block 420. The system and method sends data to an invitee at the unrecognized dialed-from number prompting entry of a passcode via the information handling system at the dialed-from number. At decision diamond 425, the system determines if the passcode received is a leader passcode set for the conference call at the bridge. If it is a leader passcode for a conference call, the system then proceeds to block 430 and sends data prompting the leader/invitee to enter a participant passcode. Upon receipt of the participant passcode the flow proceeds to block 440 where access to the conference call is granted. Then a connection to the scheduled conference call is made.

If the passcode is not a leader passcode at decision diamond 425, the flow proceeds to decision diamond 435 where it is determined whether the received data is a participant passcode matching a conference call passcode. If it is not a participant passcode, the flow returns to block 420 to prompt the invitee to re-enter a passcode. An error message that an incorrect passcode has been entered may be included in the data sent to the invitee at the dialed-from number requesting re-entry. In one embodiment, the number of attempts at re-entry of a passcode may be limited for security reasons such that upon reaching a limit, the call is disconnected. If the data received at decision diamond 435 is determined to be a participant passcode, the flow then proceeds to block 440 as above where access is granted.

If at decision diamond 415, however, conference call bound identification data is found in the conference call database matching a dialed-from number, the flow proceeds to decision diamond 450. At 450, the method and system determines if multiple matches have been found with bound identification data matching the dialed-from number. If only one match is found at decision diamond 450, the flow proceeds to decision diamond 470 of FIG. 4B via B. It is determined if the dialed-from number matches a designated meeting organizer for the conference call. The flow then proceeds as described further below.

If multiple matches for conference calls have been found at decision diamond 450, a list of all the scheduled conference calls is compiled. The list may include all matched calls scheduled to occur during a designated time period. The time period reviewed for matches in the conference call data base may limited to the day, a period of a couple of hours, or a shorter window of time. At block 455, approval is established for access to the listed conference calls found with a match. Approval for access may precede a grant of access to a conference call depending on whether a command must be received to access the conference call, such as a transfer command or if the access is automatic as in the case of the first scheduled matching conference call.

The flow proceeds to decision diamond 460 of FIG. 4B via A. The conference call management system monitors the set dial-in times for the multiple conference calls at decision diamond 460. The conference call management system determines whether any of the scheduled conference calls on the list of matching conference calls has reached an approved dial-in time for the conference call. If not, the conference call management system continues to monitor the dial-in times of the multiple conference calls found with a match at block 465. If a dial-in time for one of the conference calls occurs at decision diamond 460, the conference call management system sends data to the invitee information handling system at block 490 requesting whether to connect to the next scheduled conference call.

At decision diamond 495, a timer is started and the system and method determine if a conference call selection has been made from the list and received before a set timeout expires. If no selection is made, the system may instead receive a request to snooze the next conference call for a certain amount of time from the invitee information handling system. In an alternative embodiment, the request to delay or snooze connecting to the next conference call may be sent along with the request to connect to a second conference call. This will be useful, for example, when the dial-in time for a second scheduled conference call comes about while an invitee is still participating in a first scheduled conference. If multiple conference calls have a dial-in time occur at the same time from the list of matching conference calls, the conference call management system and method sends a list requesting which conference call to connect to next with snooze options. At decision diamond 497, the system and method determine if a snooze request has been received. If no response and not snooze request are received, the system ends offering connection to a subsequent conference call using the minimal touch option after a timeout expires and the process ends. If a snooze request is received at decision diamond 497, then the system and method proceed back to block 490 after a snooze period has passed. This snooze period may be indicated by the snooze request data or pre-defined to one or more time periods. At block 495, the flow re-requests connecting to the additional matching conference calls and determines if a response is received or determines whether additional snooze time is required at decision diamond 497.

If it is determined that a next conference call has been selected for connection at decision diamond 495, the flow proceeds to decision diamond 470. At decision diamond 470, the conference call management system and method determine if the dialed-from number matches a meeting organizer in the bound data for the next selected conference call.

If the dialed-from number does not match a meeting organizer at decision diamond 470, the flow proceeds to block 475 where the method and conference call management system auto-enters a participant passcode for the next selected conference call. The flow then proceeds to block 445 where access is granted to join the selected conference call. Then, upon connection to the selected conference call, the process may end or continue monitoring dial-in times of other matching conference calls.

If the dialed-from number does match a meeting organizer at decision diamond 470, the flow proceeds to block 480. At block 480, the method and conference call management system auto-enters a leader passcode and, if necessary, also a participant passcode for the selected conference call. Then the flow proceeds to block 445 where access is granted to join the selected conference call. Again, upon connection to the selected conference call the process may end.

The embodiment of FIG. 4 may also be used in connection with the hotkey command similar to that described above for FIG. 3. In this alternative embodiment, a conference call access attempt may occur via a hotkey command received from an invitee user information handling system. This hotkey response may be with or without prompting of access to a second conference call. At block 485, the conference call management system may receive a hotkey command to transfer to a different conference call. After a hotkey command is received from the invitee information handling system, the conference call management system and method proceeds to block 470 to determine if the ongoing dialed-from connection matches a meeting organizer. The system and method then proceed through the flow diagram from 475 or 480 to block 445 to grant access to the next selected conference call.

In may be appreciated that the order of the flow for the embodiments described in FIGS. 2-4 may be varied in several ways without deviating from the present disclosed systems and methods. In other words, the order of the flow diagrams of FIGS. 2-4 may proceed differently than depicted. For example, the currently described embodiments in FIGS. 3 and 4 have an order of participant and leader passcode entry/receipt as shown. However it can be appreciated that the order of passcode determination may be switched in a different embodiment whereby the participant passcode may be entered first followed by a request for the leader passcode. In yet another embodiment, separate passcodes may be used, one for the leader and one for participants where the meeting organizer only needs to enter a leader passcode to access the scheduled conference call. Any order of passcode entry (or auto-entry) is contemplated in the present disclosure in addition to what is shown in the described embodiments of FIGS. 3 and 4.

The embodiments of FIGS. 3 and 4 may also be understood to describe a conference call management system receiving a hotkey command to transfer to a different conference call hosted on the teleconference bridge system (as shown). In an alternative embodiment, the received hotkey command may be used to access a conference call in the first instance (not depicted). The invitee user information handling system dials into the teleconference bridge from a dialed-from number where the hotkey command triggers a dialed-from number to be transferred from an invitee user information handling system to the conference call management system. Then the flow diagrams of FIGS. 3 and 4 may proceed accordingly upon receipt of the dialed-from number from the invitee information handling system with access. Other variations on the hotkey command to transfer may also be implemented. For example, a hotkey command to transfer to the next conference call may be received anywhere after decision diamond 450 determines that multiple conference calls match the dialed-from number received. With more than two matching conference calls, a selection of the next conference call to be transferred to may need to be received.

Figure 5:
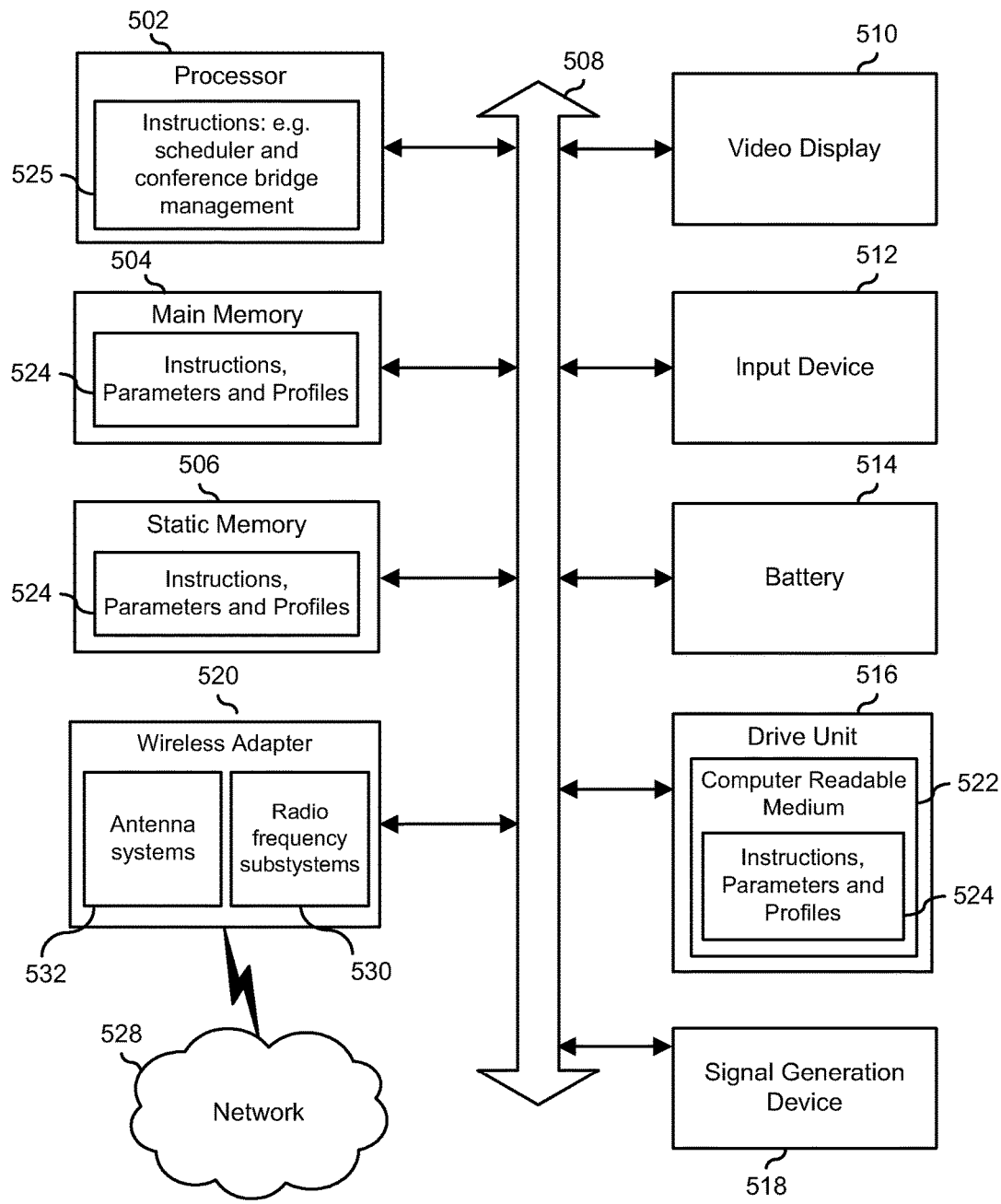
FIG. 5 is a block diagram illustrating an information handling system, according to an embodiment of the present disclosure.

FIG. 5 shows a method 500 capable of administering each of the specific embodiments of the present disclosure. The information handling system 500 can represent the user information handling systems 110, 120 and 130 or servers or systems located anywhere within network 100 of FIG. 1, including the teleconference bridge system 195 or the remote data center or cloud 180 operating the virtual machine applications described herein. The information handling system 500 may include a processor 502 such as a central processing unit (CPU), a graphics processing unit (GPU), or both. Moreover, the information handling system 500 can include a main memory 504 and a static memory 507 that can communicate with each other via a bus 508. The information handling system 500 includes signal generation device 518 such as for a speaker or a remote control. The information handling system 500 can also include a disk drive unit 516, and a network interface device 520. As shown, the information handling system 500 may further include a video display unit 510, such as a liquid crystal display (LCD), an organic light emitting diode (OLED), a flat panel display, a solid state display, or a cathode ray tube (CRT). The video display unit 510 may also act as an input accepting touchscreen inputs. Additionally, the information handling system 500 may include an input device 512, such as a keyboard, or a cursor control device, such as a mouse or touch pad. Information handling system may include a battery system 514. The information handling system 500 can represent a device capable of telecommunications and whose can be share resources, voice communications, and data communications among multiple devices. The information handling system 500 can also represent a server device whose resources can be shared by multiple client devices, or it can represent an individual client device, such as a laptop or tablet personal computer.

The information handling system 500 can include a set of instructions that can be executed to cause the computer system to perform any one or more of the methods or computer based functions disclosed herein. The computer system 500 may operate as a standalone device or may be connected such as using a network, to other computer systems or peripheral devices.

In a networked deployment, the information handling system 500 may operate in the capacity of a server or as a client user computer in a server-client user network environment, or as a peer computer system in a peer-to-peer (or distributed) network environment. The information handling system 500 can also be implemented as or incorporated into various devices, such as a personal computer (PC), a tablet PC, a set-top box (STB), a smartphone, a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single information handling system 500 is illustrated, the term "system" shall also be taken to include any collection of systems or sub-systems that individually or jointly execute a set, or multiple sets, of instructions to perform one or more computer functions.

The disk drive unit 516 or static memory 514 may include a computer-readable medium 522 in which one or more sets of instructions 524 such as software can be embedded. The disk drive unit 516 or static memory 514 also contains space for data storage. Further, the instructions 524 may embody one or more of the methods or logic as described herein. In a particular embodiment, the instructions 524 may reside completely, or at least partially, within the main memory 504, the static memory 506, and/or within the processor 502 during execution by the information handling system 500. The main memory 504 and the processor 502 also may include computer-readable media. The network interface device 520 can provide connectivity to a network 528, e.g., a wide area network (WAN), a local area network (LAN), wireless network (IEEE 802), or other network. The network interface 520 may also interface with macrocellular networks including wireless telecommunications networks such as those characterized as 2G, 3G, or 4G or similar wireless telecommunications networks similar to those described above. The network interface 520 may be a wireless adapter having antenna systems 532 for various wireless connectivity and radio frequency subsystems 530 for signal reception, transmission, or related processing.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal; so that a device connected to a network 528 can communicate voice, video or data over the network 528. Further, the instructions 524 may be transmitted or received over the network 528 via the network interface device 520.

Information handling system 500 includes one or more application programs 524, and Basic Input/Output System and Firmware (BIOS/FW) code 524. BIOS/FW code 524 functions to initialize information handling system 500 on power up, to launch an operating system, and to manage input and output interactions between the operating system and the other elements of information handling system 500. In a particular embodiment, BIOS/FW code 524 reside in memory 504, and include machine-executable code that is executed by processor 502 to perform various functions of information handling system 500. In another embodiment (not illustrated), application programs and BIOS/FW code reside in another storage medium of information handling system 500. For example, application programs and BIOS/FW code can reside in drive 516, in a ROM (not illustrated) associated with information handling system 500, in an option-ROM (not illustrated) associated with various devices of information handling system 500, in storage system 507, in a storage system (not illustrated) associated with network channel 520, in another storage medium of information handling system 500, or a combination thereof. Application programs 524 and BIOS/FW code 524 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module,", "system" or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or applications that are in communication with one another need not be in continuous communication with each other, unless expressly specified otherwise. In addition, devices, modules, resources, or applications that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    scheduling a conference call via a scheduler application on a first information handling system by recording a teleconference bridge, a date, a start time, and an end time;
    establishing a minimum required security level for access to the scheduled conference call;
    transmitting an invitation to an invitee user information handling system including a request for bound identification data for the scheduled conference call;
    receiving, at a processor, bound identification data from the invitee user information handling system in response to the request for bound identification data from the invitee user information handling system;
    associating, via the processor executing code instructions of the scheduler application, the bound identification data with the scheduled conference call;
    storing the bound identification data in a database; and
    applying security level restrictions at the minimum required security level for the scheduled conference call to bar a subset of dial-from phone numbers associated with an invitee from being used as bound identification data,
    wherein the bound identification data includes an invitee dialed-from phone number to permit restricted access to the scheduled conference call on the teleconference bridge.

2. The method of claim 1, wherein the bound identification data further comprises a plurality of invitee dialed-from phone numbers and wherein the teleconference bridge includes a teleconference dial-in phone number.

3. The method of claim 1, wherein the bound identification data further comprises a participant passcode for the scheduled conference call on the teleconference bridge.

4. The method of claim 1, wherein granting access to the scheduled conference call includes a requirement to receive data indicating the dialed-from phone number during an access attempt to the scheduled conference call is after a dial-in time for the scheduled conference call.

5. The method of claim 2, further comprising:
    assigning a plurality of security levels to the plurality of the invitee dialed-from phone numbers to limit accessibility depending on security level of the scheduled conference call.

6. The method of claim 1, wherein the bound identification data further comprises a leader passcode data for a meeting organizer of the scheduled conference call.

7. The method of claim 1, further comprising:
receiving the bound identification data together with data accepting a scheduled conference call invitation.

8. A method comprising:
receiving bound identification data from an invitee information handling system in response to a request for the bound identification data transmitted with an invitation to a scheduled conference call;
receiving data indicating a dialed-from phone number during an access attempt to the scheduled conference call at an information handling system hosting the scheduled conference call;
determining, via a processor executing code instructions of a teleconference management system application, whether the dialed-from phone number received during an access attempt to the scheduled conference call matches bound identification data associated with the scheduled conference call and stored in a bound identification data database;
determining whether a security level associated with the dialed-from phone number meets a minimum security level for the scheduled conference call;
applying security level restrictions at the minimum security level for the scheduled conference call to bar a subset of dial-from phone numbers associated with an invitee from being used as bound identification data; and
if matched meeting the minimum security level, granting restricted access to the scheduled conference call;
wherein the bound identification data includes the dialed-from phone number received from the invitee information handling system in response to the request for the bound identification data.

9. The method of claim 8, wherein granting access to the scheduled conference call further depends on receiving data indicating the dialed-from phone number received during the access attempt to the scheduled conference call is after a dial-in time for the scheduled conference call.

10. The method of claim 8, further comprising:
auto-entering the conference call participant passcode if matched.

11. The method of claim 8, wherein the bound identification data includes a plurality of invitee dialed-from phone numbers a with a plurality of security levels assigned to the plurality of the invitee dialed-from phone numbers to limit accessibility depending on security level of the scheduled conference call.

12. The method of claim 8, further comprising:
determining whether the dialed-from phone number received during the access attempt to the scheduled conference call matches bound identification data associated with a meeting organizer for the scheduled conference call; and
if so, auto-entering a leader passcode.

13. The method of claim 8, further comprising:
if the dialed-from phone number received during the access attempt to the scheduled conference call matches the bound identification data associated with a plurality of scheduled conference calls, sending data listing the plurality of conference calls available.

14. The method of claim 13, further comprising:
receiving data indicating which from the plurality of conference calls is selected; and
auto-entering the conference call participant passcode for the selected conference call.

15. A method comprising:
receiving bound identification data from an invitee information handling system in response to a request for the bound identification data transmitted with an invitation to a first scheduled conference call;
receiving data indicating a dialed-from phone number during an access attempt to the first scheduled conference call at an information handling system hosting the first scheduled conference call and the second scheduled conference call;
determining, via a processor executing code instructions of a teleconference management system application, whether the dialed-from phone number matches bound identification data associated with the first scheduled conference call received from the invitee user information handling system;
determining whether the dialed-from phone number matches bound identification data associated with the second scheduled conference call;
determining whether a security level associated with the dialed-from phone number meets a minimum security level for the first scheduled conference call;
applying security level restrictions at the minimum security level for the first scheduled conference call to bar a subset of dial-from phone numbers associated with an invitee from being used as bound identification data
if matched to the first scheduled conference call meeting the minimum security level, granting restricted access to the first scheduled conference call;
if matched to the second scheduled conference call, approve restricted access to the second scheduled conference call; and
receiving a command to transfer to the second scheduled conference call;
wherein the bound identification data includes a dialed-from phone number received from the invitee information handling system in response to the request for the bound identification data.

16. The method of claim 15, further comprising:
if matched to the second scheduled conference call, sending, at or after a dial-in time for the second scheduled conference call, data to an invitee information handling system requesting a command to transfer to the second scheduled conference call.

17. The method of claim 15, further comprising:
granting access to the second scheduled conference call upon receiving a command to transfer to the second scheduled conference call.

18. The method of claim 15, further comprising:
auto-entering the conference call participant passcode for the second scheduled conference call.

19. The method of claim 15, further comprising:
disconnecting from the first scheduled conference call and connecting to the second scheduled conference call.

20. The method of claim 15, wherein receiving the command to transfer to the second scheduled conference call further comprises receiving a hotkey indicator from an invitee information handling system.

* * * * *